United States Patent Office 3,465,434
Patented Sept. 9, 1969

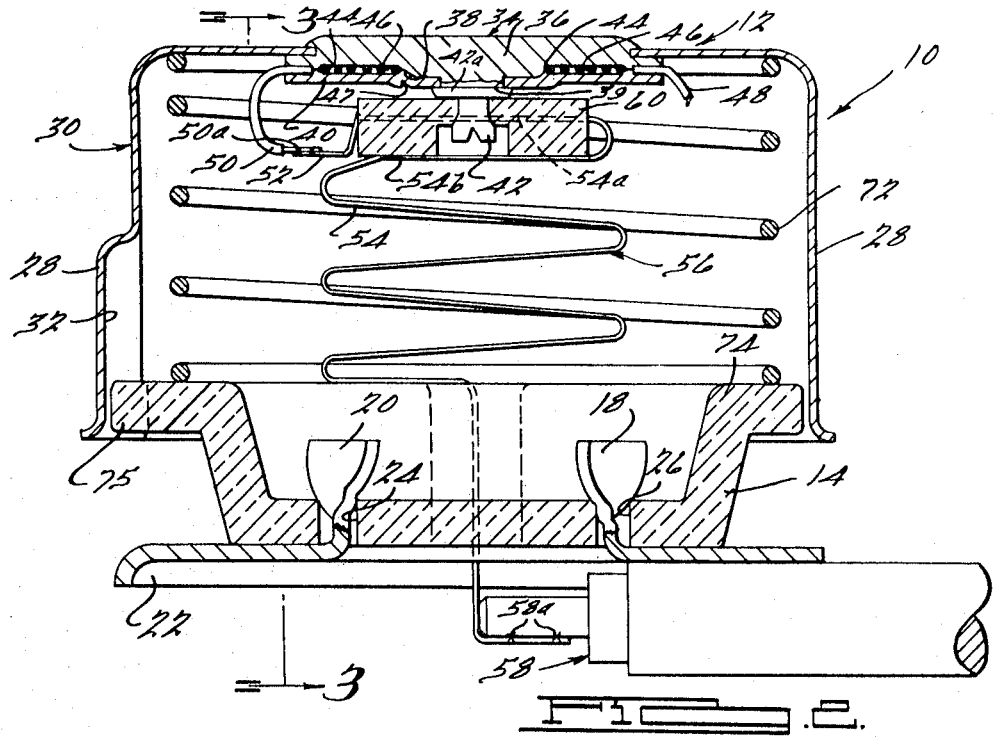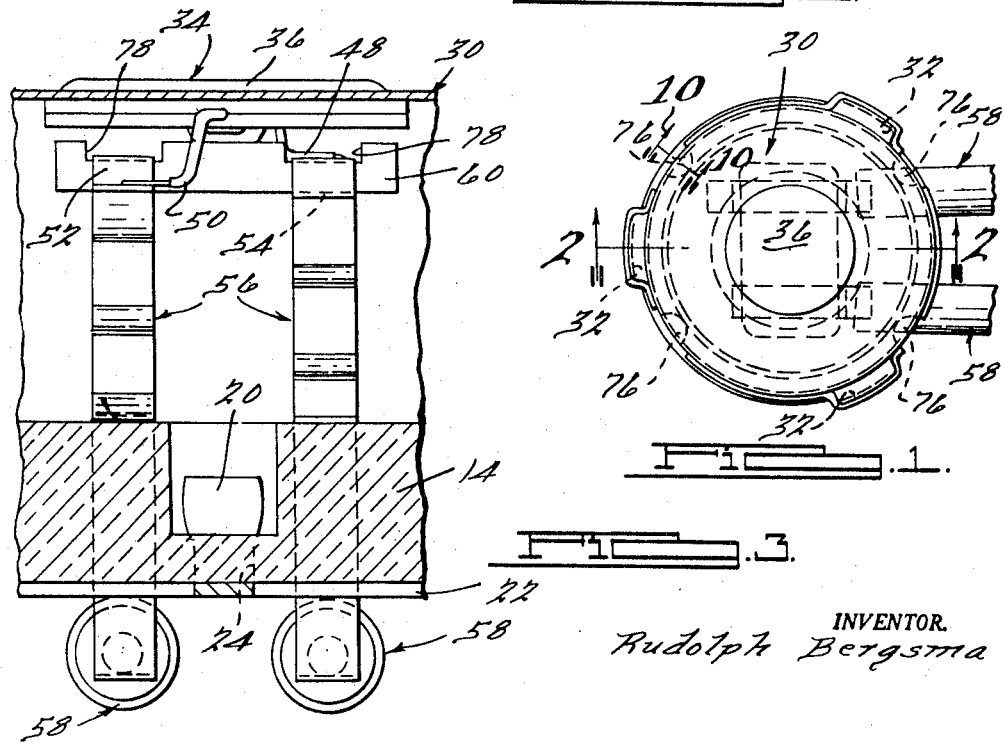

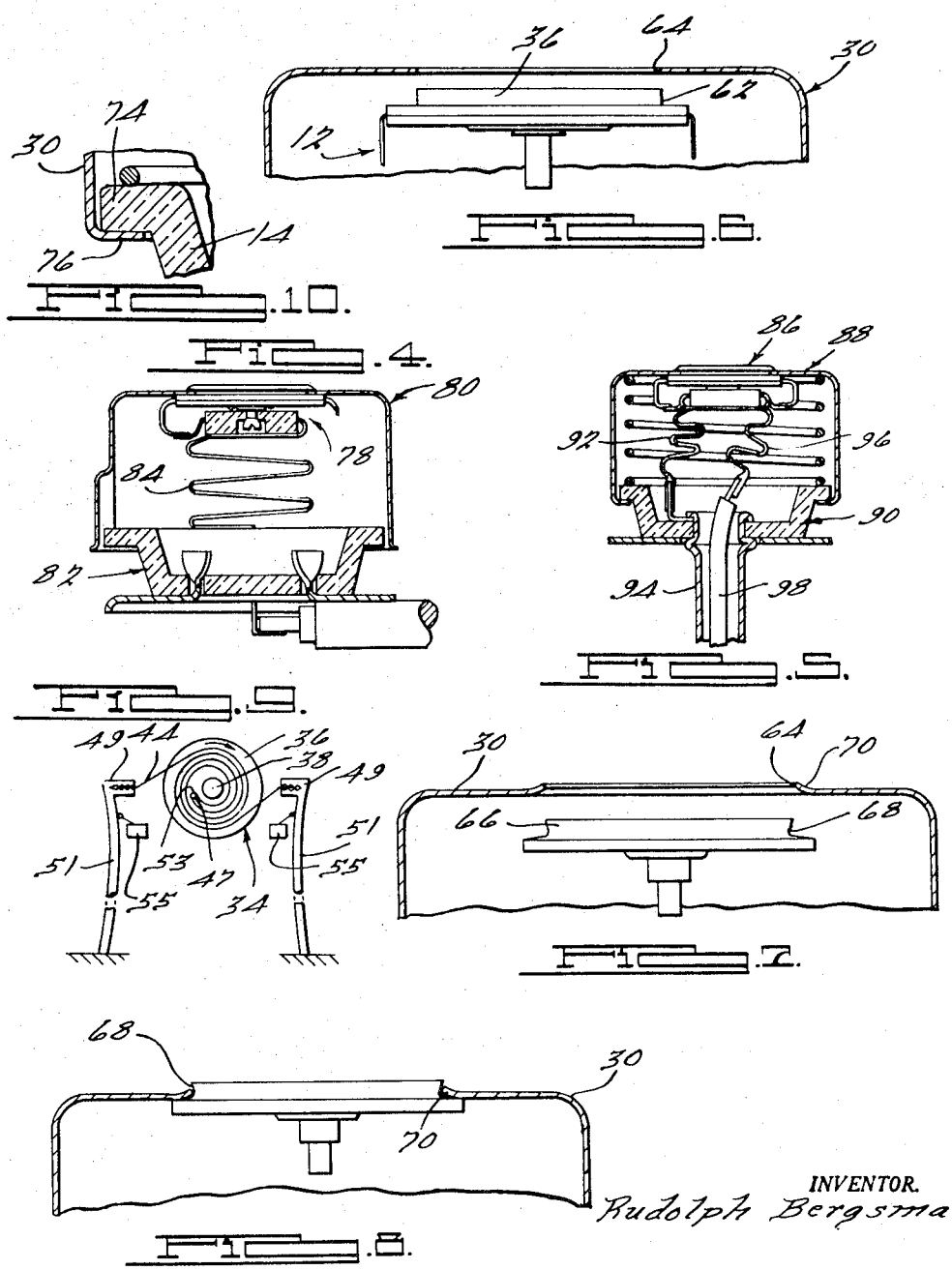

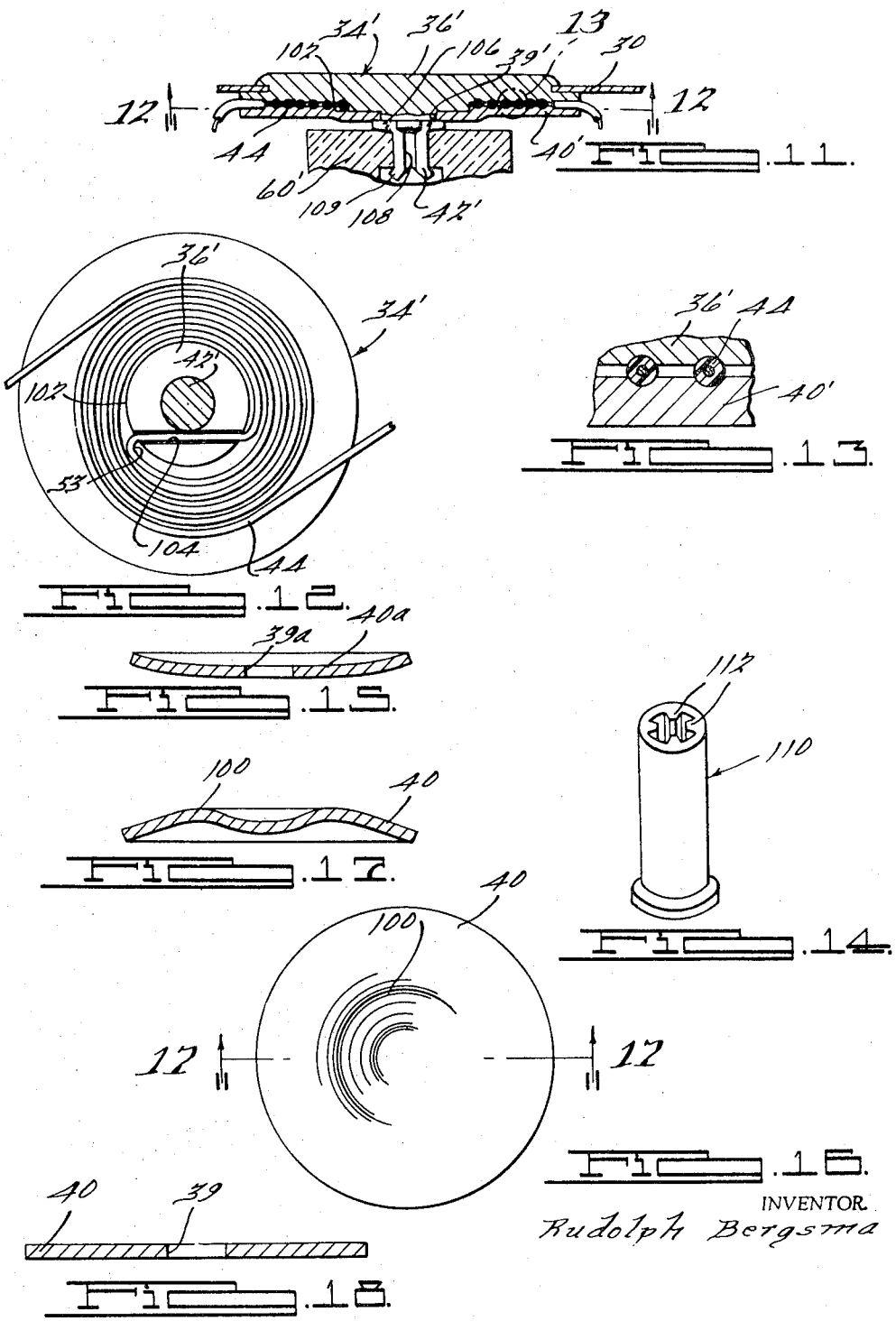

3,465,434
METHOD OF MAKING A TEMPERATURE SENSOR
Rudolph Bergsma, Ann Arbor, Mich., assignor to King-Seeley Thermos Co., Ann Arbor, Mich., a corporation of Michigan
Original application Oct. 19, 1961, Ser. No. 146,176, now Patent No. 3,268,844, dated Aug. 23, 1966. Divided and this application July 18, 1966, Ser. No. 565,768
Int. Cl. B21d 39/00; H01c 17/00
U.S. Cl. 29—613         8 Claims

ABSTRACT OF THE DISCLOSURE

A method of manufacturing a temperature sensing device in which the sensing wire is bifilarly wound and in which the sensor is secured to a cap.

---

This invention relates to an improved method of manufacturing temperature responsive elements and more particularly to an improved method of manufacturing an improved temperature sensor adapted to be in intimate heat transfer relationship with a body receiving heat from what is commonly known in the household appliance industry as a surface heater. This is a division of my co-pending application Ser. No. 146,176, filed Oct. 19, 1961, now patent 3,268,844.

The principal object of this invention is to improve the manufacture of temperature sensors.

In general, in accordance with the foregoing object, a temperature sensing device is manufactured by fixing a portion of a temperature sensing wire in the region of the center of a pellet and bifilarly winding the wire within the pellet with the bight of the bifilar winding near the center of the pellet.

With the above as well as the other and, in certain cases, more detailed objects in view, preferred but illustrative embodiments of the invention are shown in the accompanying drawings, throughout the several views of which corresponding reference characters are used to designate corresponding parts and in which:

FIGURE 1 is a plan view of a temperature sensor constructed in accordance with the principles of the present invention.

FIGURE 2 is an enlarged view in vertical central section taken along the line 2—2 of FIG. 1 looking in the direction of the arrows;

FIG. 3 is a view in vertical section taken along the line 3—3 of FIG. 2 looking in the direction of the arrows;

FIG. 4 is a view in vertical section of another embodiment of a surface heater sensor in accordance with the principles of the present invention;

FIG. 5 is a view in vertical section of a further embodiment of the invention;

FIG. 6 is a view of portions of the embodiment illustrated in FIGS. 1-3 in the course of final assembly;

FIG. 7 is a further modification of the invention in the course of final assembly;

FIG. 8 is an assembled view of the modification illustrated in FIG. 7;

FIG. 9 is a diagrammatic view illustrating the bifilar winding method of the present invention;

FIG. 10 is an enlarged view in vertical section taken along the line 10—10 of FIG. 1 looking in the direction of the arrows;

FIG. 11 is a view in vertical section of the sensor portion of a still further embodiment of the invention;

FIG. 12 is a view in horizontal section taken along the line 12—12 of FIG. 11;

FIG. 13 is an enlarged view of detail 13 in FIG. 11;

FIG. 14 is a view in perspective of a tubular punch used in the assembly of the embodiment of FIG. 11;

FIG. 15 is an enlarged view in vertical section of a backing plate portion of the sensor assembly which is dished upwardly at its outer peripheral edges;

FIG. 16 is a plan view of a blank backing plate deformed to compensate for the dishing effect shown in FIG. 15;

FIG. 17 is a view in vertical section taken along the line 17—17 of FIG. 16; and FIG.—18 is a view in vertical section of the blank backing plate of FIGS. 16 and 17 following fabrication.

Referring now to the drawings, FIGS. 1–3 illustrate one embodiment of a temperature sensor assembly 10 constructed in accordance with the present invention. The sensor 10 is adapted to be concentrically located with respect to a surface heater (not shown) such as a gas burner or an electrical heating element which is in heat transfer relationship with an object such as a cooking utensil which is supported on or adjacent the surface heater. As an illustrative example, the cooking utensil may rest upon an improved sensor portion 12 of the sensor assembly 10 so that as the underside of the cooking utensil approaches a preselected temperature the improved surface heater sensor assembly 10 will indicate the attainment of the preselected temperature by lighting a light or energizing a buzzer, or may, by way of further example, control the heat output of the surface heater by actuating a solenoid inlet valve to a gas burner or open or close a relay to energize or deenergize an electrical heating element.

A fixed base 14, preferably consisting of a ceramic electrical insulating material such as steatite or the like, stationarily supports the sensor assembly 10 with respect to a surface heater as, for example, on the spider-bracket assembly illustrated in application No. 860,280, filed Dec. 17, 1959, now patent No. 3,153,139, by Emil E. Sivacek, or on a rigid conduit-hanger assembly as illustrated in application Ser. No. 169,066 filed Jan. 26, 1962, now abandoned, by Gary F. Woodward. In the illustrative embodiment of FIGS. 1-3, a support plate 22 having tabs 18, 20, extending through apertures 24, 26 in the base 14 support the surface heater assembly 10 concentrically with respect to a surface heater as disclosed in the aforesaid Woodward application.

The sensor portion 12 includes a pellet 34, of a good thermally conductive material such as aluminum, brass or the like, having an upper plate or disc portion 36. The plate 36 has a tapered annular shoulder 38, which may be and is representatively shown to be integral with the plate 36. An arbor 42 which projects from the plate 36 extends through a central aperture 39 in a backing plate portion 40 which is held in axial abutment with the plate 36 by a shoulder 42a on the arbor 42. A bifilar wire 44 is carried between the plate 36 and the backing plate 40 in an annular groove 46 defined thereby. Terminal ends 48, 50 of the wire 44 extend outwardly from between the plate 36 and the backing plate 40 at peripherally spaced points.

The upper surface of the plate 36 is adapted to be in intimate heat transfer contact with the bottom surface of a cooking utensil which is located in heat transfer relationship with the surface heater as mentioned above. The surface area of the plate 36 is relatively large in proportion to its mass and thickness, which makes it very sensitive to utensil temperature change and comparatively insensitive to side radiation from the surface heater (not shown) which is preferably located radially outwardly from the pellet 34.

The outer peripheral edge of the plate 36 is connected to a movable member or skirted cap 30 which has a low coefficient of thermal conduction, and in one constructed arrangement was formed of stainless steel having a thin cross-section to minimize radial transfer of heat from the surface heater directly to the sensor portion 12 and to minimize the conduction to the sensor of heat radiantly transferred to the cap 30 from the surface heater. The skirted cap 30 has a smooth upper surface which encloses the top portion of the sensor assembly to prevent the entrance of food particles and the like into its interior which might otherwise tend to jam the free relative movement between the sensor portion 12 and base 14. Such construction also enables the sensor assembly to be quickly cleaned by wiping off the smooth upper surface of the cap 30.

In order to bias the cap 30 upwardly so as to maintain pellet 34 in intimate engagement with the cooking utensil, a coil spring 72 is interposed between the cap 30 and the base 14. The upper end of the coil spring 72 bears against the interior surface of the top of the cap 30 and the lower end of the coil spring 72 rests on an upper flange 74 of the base 14. A skirt 28 on the movable member or skirted cap 30 has a plurality of circumferentially spaced grooves 32 which receive a corresponding plurality of circumferentially spaced ears 75 on the base 14 to prevent relative rotation therebetween and provide a limit to depressing movement of the cap 30 and the pellet 34 with respect to the base support 14.

In order to prevent jamming of the cap 30 on the base 14 which might otherwise occur where lateral forces tilt the cap 30 relative thereto, the height of the upper flange 74 is made small relative to the diameter of the base 14. Such structure enables the cap 30 to tilt relative to the base 14 without jamming since the interior surface of the grooves 32 engages the ears 75 on the flange 74 to freely pivot the cap 30 on the base 14. Such tilting might otherwise cause the cap of such an assembly to be jammed in a depressed position. In cases in which the assembly is hot it is difficult to release the cap from such jammed positions.

The cap 30 also has a plurality of circumferentially spaced tab portions 76, best illustrated in FIGS. 1 and 10, at the base thereof which engages the underside of the flange 74 on the base 14. The tab portions 76 hold the cap 30 on the base portion 14 against the biasing action of the spring 72 and also allow the cap 30 to pivot on the base 14 without jamming when the sensor portion 12 is fully extended.

The sensing wire 44 of the sensor portion 12 is electrically connected to a suitable temperature controlling system by spaced electrically conductive serpentine or ripple springs 56 made up of a plurality of reversely bent portions 54 and a U-shaped upper end portion 52 which is connected to the respective ends 48 and 50 of the sensing wire 46 as by welding at points 50a. The opposite ends of the serpentine springs 56 extend through suitable apertures on the base portion 14 to connect as by welding at points 58a to spaced rigid conductors 58 which extend outwardly to a terminal portion (not shown) adapted to removably connect to the temperature controlling system in a low temperature ambient zone. In accordance with concepts set forth in application No. 860,280, filed Dec. 17, 1959, now Patent No. 3,153,139, by Emil E. Sivacek, the sensing wire 44 is, therefore, connected to the temperature controlling system through a continuous conductor path which prevents any noticeable high temperature corrosion of the conductive path and thereby prevents resistance variations which otherwise would affect the operation of the improved temperature sensor assembly.

A spring support block 60 is concentrically disposed on the arbor 42 and stacked thereon by deforming the end of the arbor 42 thereagainst to provide a positive locating and mounting means for the upper end portions 52 of the serpentine conductor springs 56 so that the sensor portion 12 is not strained by the spring conductors 56. The upper legs 54a of the U-shaped upper end portion 52 are received in spaced grooves 78 in the upper surface of the support block 60, and spring legs 54b of the upper end portion 52 underlie the lower surface of the support 60. The ends 52 are snapped into place by spreading the legs 54a, 54b and, when in place, these legs resiliently grip the support 60.

All of the forces from spring conductors 56, therefore, are carried by the support 60. This prevents bending of the ends 48, 50 of the sensing wire 46 and at the junctures 50a between the ends 48, 50 and the ends 52 of the spring conductors 56. Such bending is undesirable since it would strain the ends 48, 50 and thereby change the resistance of the sensor portion 12. Likewise, such bending could break the connections between the ends 48, 50 and the spring conductors 56. In either event, the operation of the sensor assembly would be adversely affected.

The spring support block 60 is spaced from the pellet 34 of the sensor portion 12 to provide an insulating air gap therebetween that prevents the support block 60 which has a greater heat storage capacity than the pellet portion 34 of the assembly from affecting its heat storage characteristics. Thus, the pellet portion 34 quickly responds to the temperature of a utensil which is in intimate heat transfer contact therewith. The support block 60 shields the pellet 34 from the lower portions of the sensor assembly and thereby prevents radiant heat transfer from this region to the pellet 34.

Previous temperature sensors of this type had conductors insulated by material which would break down over a period of use when subjected to high temperature ambient conditions. Such conductors would often contact one another or adjacent portions of the sensor assembly and when the insulation broke down, the assembly could be shorted out and become inoperative. The serpentine spring conductors 56 of the present invention are, therefore, uninsulated and of a high nickel alloy such as "D" nickel, an alloy including about 95% nickel and 4.5% manganese. Furthermore, in the illustrated embodiment, the bent portions 54 have a generally flat rectangular cross section of substantial width to prevent lateral deflection or buckling of the conductors 56 as the sensor portion 12 moves relative to the base 14. It will, of course, be understood that bent portions 54 having circular, elliptical or other cross sections would be suitable for purposes of the invention if formed so as to inhibit lateral deflection or buckling. Such a configuration prevents the uninsulated conductors 56 which are spaced apart by the spring support 60 from contacting one another or adjacent portions of the sensor assembly during the relative movement of the sensor portion 12 with respect to the base portion 14. Thus, the improved sensor assembly will not short out even though its conductor portions are uninsulated.

The improved uninsulated serpentine spring conductors 56 are also highly flexible and permit yielding relative movement between the sensor portion 12, cap 30 and the base 14. It has been found that the serpentine spring construction and the shielding of the spring conductors 56 from high temperatures materially reduces work-hardening of conductors connected between a movable sensor portion and a fixed base portion in surface heater assemblies of the aforedescribed type.

In a generic sense, the serpentine spring conductors 56 may be initially compressibly mounted between the fixed base 14 and the movable sensor portion 12 or can be initially unstressed or in tension between the movable sensor portion 12 and the base 14. It is preferred, however, that the stress in the serpentine spring 56, whether tension or compression, does not reverse in use. In one constructed embodiment illustrated in FIGS. 1-3, the serpentine springs 56 were continuously under compression through all positions of the movable sensor portion 12 with respect to the base 14 and so supplement the force of the spring 56 in urging the sensor portion 12 away from the base 14 to assure the engagement of the plate 36 of the pellet 34 with a cooking utensil or the like.

Another embodiment of the improved temperature sensor, illustrated in FIGS. 11-14, is, except as noted below, identical in structure and mode of assembly, to the embodiment of FIGS. 1-3. In FIGS. 11-14 the pellet 34' has a vertical annular shoulder 102 about which the sensing wire is wound between the upper plate portion 36' and the backing plate 40'. A chordal groove 104 in the bottom surface of the upper plate 36' and tangent to the arbor 42', receives the mid-portion of the sensing wire 44 which is held therein by the backing plate 40' which is in axial abutment with the bottom surface of the upper plate 36'. A plurality of circumferentially spaced tabs 106 extend radially outwardly at the upper end of a like number of elongated grooves 108 in the arbor 42', to hold the backing plate 40' against the upper plate 36'. The undersurfaces of the plurality of tabs 109 engage the underside of the spring support block 60' and secure it and pellet 34' together.

Reverting to the structure of FIGS. 1-3, the improved method of manufacturing the improved sensor portion or pellet 34 comprises the steps of placing the backing plate 40 on the arbor 42 in axial abutment with the plate 36 adjacent the shoulder 38. Radially outwardly of the shoulder 38 the plate 36 is spaced from the backing plate a distance equal to the diameter of the sensing wire 44.

The backing plate 40 must be absolutely flat to maintain the spacing between it and the plate 36 equal to the diameter of the sensing wire 44 so that the sensing wire 44 is positively guided into the pellet without forming double layers of wire and the like. The backing plate 40 is preferably formed by a stamping operation or the like which conjointly forms the central aperture 39 in the backing plate through which the arbor 42 extends. When the sheet of material forming the blank backing plates is initially flat the finished backing plates are slightly dished. A magnified example of such dishing is illustrated in FIG. 15 where the outer peripheral edges of a backing plate 40a are turned upwardly so that the backing plate is located too far from the plate 36 adjacent the arbor portion of the assembly and too close adjacent the peripheral edge of the plate 36. The material from which the backing plate is stamped, therefore, has an annular dent 100, as illustrated in FIGS. 16 and 17, concentric with the location of the central aperture 39 of the finished backing plate 40. The dent 100 turns the peripheral edges of the blank backing plate downwardly to counteract the tendency for the edges to dish upwardly during the stamping operation and causes the finished backing plate 40 to be absolutely flat as illustrated in FIG. 18.

The arbor 42 is then spun to form the shoulder 42a which holds the backing plate 40 against the plate 36. Thereafter, a strand of the sensing wire is placed in the annular groove 46 defined by the plate 36 and the backing plate 40 and the backing plate is deformed as at 47 (FIG. 9) for fixing the wire 44 with respect to the pellet 34. In the alternative embodiment illustrated in FIGS. 11-14, the sensing wire 44 is fixed with respect to the pellet 34' prior to winding by placing the center portion of the sensing wire 44 in the chordal groove 104 in the bottom surface of the upper plate 36'. The arbor 42' is then inserted through the aperture 39' in the backing plate 40' until the upper surface of the backing plate 40' engages the bottom surface of the upper plate 36' to secure the sensing wire 44 in the upper plate 36'. Then the backing plate 40' is fixed in axial abutment with the upper plate 36' by inserting the arbor 42' in a tubular punch 110 illustrated in FIG. 14, which has an inner diameter equal to the outer diameter of the arbor 42' and a plurality of circumferentially spaced radially inwardly extending cutting edges 112. The punch 110 is driven against the arbor 42' and the edges 112 cut the grooves 108 in the arbor 42' to form the tab portions 106 which securely hold the plate 40' in place. The bottom surface of each of the tab portions 106 forms a backing surface for the conductor support plate 60' which is firmly secured on the arbor 42' by bending the tabs 109 of the arbor 42' over the underside of plate 60'.

Continuing with the assembly of structure of FIGS. 1-3 (the same procedure also being followed in producing the structure of FIGS. 11-14), the pellet and wire are then placed in a fixture shown diagrammatically in FIG. 9, in which figure the backing plate 40 is removed so as to reveal the wire 44. The fixture has means (not shown) for rotating the pellet 34 to wind the wire thereon. During rotation of the pellet the wire is continually tensioned to a degree which assures uniform winding but which will not deform the wire. The tension may be maintained in any conventional manner, for example, in FIG. 9 the terminal ends 48 and 50 of the sensing wire 44 are held by suitable clamps 49 on cantilevered spring arms 51 which are initially deflected a substantial distance from the pellet 34 to tension the wire 44 held therebetween. The pellet 34 is then rotated about an axis defined by the longitudinal axis of the arbor 42 causing a bight 53 to form in the wire 44 adjacent the point 47 (or the chordal groove 102 in FIGS. 11-14). Rotation of the pellet 34 continues to bifilarly wind the wire 44 between the plate 36 and the backing plate 40. As the wire 44 winds on the pellet 34 the spring arms 51 are pulled inwardly to a point at which they close limit switches 55 to energize means indicating that a preselected length of wire has been wound between the plate 36 and the backing plate 40. At this point the terminal ends 48, 50 of the wire 44 extend outwardly from between the plate 36 and the backing plate 40 at peripherally spaced points.

In the bifilar winding technique the sensing wire 44 is wound on the pellet 34 in half the revolutions required for unifilar winding. Furthermore, the winding fixture can be sized for one-half the lead length of unifilar winding where the winding starts at one end of the wire length. Thus, the fixture can be of a simpler, more economical construction. Furthermore, the bifilar technique eliminates the need for threading one end of the sensing wire through the backing plate as when the wire is wound from one end of a length of wire in the unifilar technique. The elimination of the threading process and the fewer number of revolutions required in the bifilar technique substantially reduces the time for assembling a single temperature sensor assembly and thereby materially reduces unit costs.

The next step in manufacturing the sensor pellet is to effectively seal the sensing wire 44 between the plate 36 and the backing plate 40, establishing in the process an intimate heat transfer relationship between these plates and the senser wire 44 as illustrated in FIG. 13. This is accomplished by placing the pellet 34 in a press adapted to provide forces of substantial magnitude pressing plates 36, 40 together. Desirably, but not imperatively, this compressing action is of sufficient magnitude to move portions of the adjacent surfaces of the plates into engagement with one another. For example, in the embodiment of FIGS. 1-3, the backing plate 40 follows the shoulder 38 on plate 36 and the outer peripheral portions of plates 36 and 40 are pressed into engagement. The press is provided with suitable relief at the arbor 42 and the points at which the wire terminals 48, 50 extend outwardly of the pellet 34. It has been found that if plates 36, 40 are formed of proper materials, the wire 44 may be physically embedded in one or both of the adjacent surfaces and sealed at the periphery of pellet 34 in a manner best described in Patent No. 2,980,875 issued Apr. 18, 1961, to Emil E. Sivacek, which is herein incorporated by reference.

The assembly of the sensor portion 12 is completed by concentrically disposing the support 60 on the arbor 42 and deforming the end of the arbor 42 to stake the support firmly thereon. The upper end portions 52 of the serpentine spring conductors 56 are snapped in the grooves 78 formed in the support 60 and the end portions 48, 50 of the sensing wire 46 are connected to the upper end portions 52 of the serpentine spring conductors 56 by suitable means such as welding.

In accordance with one improved method for assembling the improved temperature portion 12 with the skirted cap 30, the upper plate 36 of the pellet 34 is provided with a vertical peripheral edge 62 illustrated in FIG. 6 which freely fits through an aperture 64 in the top of the cap 30. Once the aperture 64 of the cap 30 is concentrically disposed about the plate 36 the assembly is preferably rotated relative to a suitable tool to spin the vertical edge portion 62 of the plate 36 into engagement with adjacent edges on the cap portion 30 to firmly secure the cap 30 against rotation with respect to the sensor portion 12.

An alternative arrangement for assembling the sensor portion 12 with respect to the cap 30 is illustrated in FIGS. 7 and 8. In this form a plate 66 on a pellet similar to that illustrated in the first embodiment has a reentrant edge portion 68 which is adapted to snap through the aperture 64 formed in the cap portion 30. In this case the aperture 64 is defined by an upwardly turned circumferential edge portion 70 which yieldingly engages the reentrant edge portion 68 to prevent rotation or axial movement of the pellet portion of the improved surface heater sensor with respect to the cap 30. In assembling the sensor portion 12 the aperture 64 is enlarged as the edge portion 70 yields against the insertion of the pellet into the aperture 64. Thus the reentrant edge portion 68 passes therethrough. The edge portion 70 then snaps against the reentrant edge to reduce the size of aperture 64 and firmly engage the pellet 34.

Once the pellet 34 is connected to the cap 30 the serpentine spring conductors 56 are connected to the conductors 58 and tab portions 76 on the cap 30 are bent into engagement with the underside of the upper flange 74 of the base 14 to complete the improved sensor assembly 10.

FIG. 4 illustrates an alternative arrangement having a sensor portion 78 which connects to a movable cap portion 80 which yieldingly connects to a base portion 82. The details of this embodiment of the invention are counterparts of the details in the embodiment of the invention illustrated in FIGS. 1–3, except that the ripple spring conductors 84 of this embodiment are of a heavier gage material than the conductors 56. It has been found that the coil spring 72 and the lighter gage conductors 56 of the embodiment of FIGS. 1–3 can be replaced by the heavier gage ripple spring conductors 84 which will maintain the pellet portion of the sensor 78 in intimate heat transfer contact with the body whose temperature is to be sensed.

A still further embodiment of the invention illustrated in FIG. 5 includes a sensor portion 86 carried by a cap portion 88 movably mounted on a base 90. This embodiment of the invention is similar to the other embodiments except that one ripple spring conductor 92 electrically connects to a tubular conductor 94. The second ripple spring 96 connects to an electrical conductor 98 extending through and electrically insulated from the tubular conductor 94.

It will be understood that the specific constructions and methods of manufacture of the improved temperature sensor assemblies which are herein disclosed and described are presented for purposes of explanation and illustration and are not intended to indicate limits of the invention, the scope of which is defined by the following claims.

What is claimed is:

1. A method of manufacturing a temperature sensing device including an insulated wire sandwiched between a pair of plates comprising the steps of fixedly securing the plates together and fixing an intermediate portion of said wire in the region of the center of one of the plates, tensioning a portion of said wire lying between said intermediate portion and each end, and bifilarly winding the wire outwardly with respect to the center of said plate.

2. A method of manufacturing a temperature sensing device including a pellet having an insulated wire surrounding a metal arbor and sandwiched between plates comprising the steps of fixedly securing the plates together and fixing an intermediate portion of said wire adjacent said arbor and bifilarly winding the wire with respect to said arbor between said plates.

3. A method of manufacturing a temperature sensing device including a pellet having an insulated wire surrounding a metal arbor and sandwiched between plates comprising the steps of fixedly securing the plates together and fixing intermediate portion of said wire adjacent said arbor, tensioning each section of wire lying between said intermediate portion and each end thereof, bifilarly winding said wire with respect to said arbor between said plates, and interrupting said winding when a preselected length of said wire is wound between said plates.

4. A method of manufacturing a temperature sensing device including a cap portion and a pellet having an insulated wire surrounding a metal arbor and sandwiched between metal plates comprising the steps of fixing said wire adjacent said arbor, bifilarly winding said wire with respect to said arbor between said metal plates, and fixing one of said plates on said cap portion to prevent relative movement between said pellet and said cap portion.

5. A method of manufacturing a temperature sensing device including a cap portion and a pellet having an insulated wire surrounding a metal arbor and sandwiched between metal plates comprising the steps of fixing said wire adjacent said arbor, tensioning said wire, bifilarly winding said wire with respect to said arbor, interrupting said winding when a preselected length of the wire is wound between said metal plates, and fixing one of said plates on said cap portion for preventing relative movement between said pellet and said cap portion.

6. A method of manufacturing a temperature sensing device including a cap having an aperture and a pellet having an insulated wire surrounding a metal arbor and sandwiched between metal plates, one of which has a vertical peripheral edge comprising the steps of winding a preselected length of said wire between said metal plates, inserting the vertical peripheral edge of said metal plate through said cap aperture, and deforming said vertical peripheral edge into engagement with said cap for preventing relative movement between said pellet and said cap.

7. A method of manufacturing a temperature sensing device including a cap having an aperture and a pellet having an insulated wire surrounding a metal arbor and sandwiched between metal plates one of which has a peripheral reentrant edge, comprising the steps of winding a preselected length of said wire between said metal plates, enlarging said aperture, inserting said reentrant edge through said enlarged cap aperture, and reducing the size of said aperture until said cap engages said reentrant edge for preventing relative movement between said pellet and said cap.

8. A method of manufacturing a temperature sensing device including a cap having an aperture and a pellet having an insulated wire surrounding a metal arbor and sandwiched between metal plates, one of which has a peripheral reentrant edge, comprising the steps of winding a preselected length of said wire between said metal plates, enlarging the aperture in said cap by inserting said reentrant edge through said cap aperture and reducing said cap aperture by snapping the cap against said reentrant edge once it has been inserted through said aperture for preventing relative movement between said pellet and said cap.

References Cited

UNITED STATES PATENTS

| | | | |
|---|---|---|---|
| 443,256 | 12/1890 | Logan | 29—173 X |
| 3,037,179 | 5/1962 | Otto | 338—28 |
| 3,042,783 | 7/1962 | Mertler | 338—25 X |
| 3,088,016 | 4/1963 | Mertler et al. | 219—450 |
| 3,110,954 | 11/1963 | Sivacek | 29—618 X |
| 2,703,833 | 3/1955 | Vanvor | 338—28 |
| 2,715,651 | 8/1955 | Harrison | 140—922 X |

CHARLIE T. MOON, Primary Examiner

U.S. Cl. X.R.

29—452, 453, 509, 922